(12) United States Patent
Mital et al.

(10) Patent No.: US 9,152,564 B2
(45) Date of Patent: Oct. 6, 2015

(54) EARLY CACHE EVICTION IN A MULTI-FLOW NETWORK PROCESSOR ARCHITECTURE

(71) Applicant: Intel Corporation, Santa Clara, CA (US)

(72) Inventors: Deepak Mital, Orefield, PA (US); William Burroughs, Macungie, PA (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 13/687,971

(22) Filed: Nov. 28, 2012

(65) Prior Publication Data

US 2013/0091330 A1   Apr. 11, 2013

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of (Continued)

(51) Int. Cl.
  *G06F 7/38*      (2006.01)
  *G06F 9/00*      (2006.01)
  *G06F 9/44*      (2006.01)
  *G06F 15/00*     (2006.01)
  *G06F 12/08*     (2006.01)

(Continued)

(52) U.S. Cl.
  CPC .......... *G06F 12/084* (2013.01); *G06F 12/0804* (2013.01); *G06F 15/7825* (2013.01); *H04L 49/9089* (2013.01); *H04L 69/12* (2013.01)

(58) Field of Classification Search
  None
  See application file for complete search history.

(56) References Cited

U.S. PATENT DOCUMENTS 4,123,795 A   10/1978   Dean, Jr. et al.
4,622,631 A   11/1986   Frank et al.

(Continued)

FOREIGN PATENT DOCUMENTS

JP   H02-271444   11/1990

OTHER PUBLICATIONS

Alan H. Karp and Rajiv Gupta, "Hardware Assist for Data Merging for Shared Memory Multiprocessors", Hewlett Packard Labs, Palo Alto, CA, Mar. 13, 1994.

(Continued)

*Primary Examiner* — Corey S Faherty
(74) *Attorney, Agent, or Firm* — Nicholson De Vos Webster & Elliott LLP

(57) ABSTRACT

Described embodiments provide an input/output interface of a network processor that generates a request to store received packets to a system cache. If an entry associated with the received packet does not exist in the system cache, the system cache determines whether a backpressure indicator of the system cache is set. If the backpressure indicator is set, the received packet is written to the shared memory. If the backpressure indicator is not set, the system cache determines whether to evict data from the system cache in order to store the received packet. If an eviction rate of the system cache has reached a threshold, the system cache sets a backpressure indicator and writes the received packet to the shared memory. If the eviction rate has not reached the threshold, the system cache determines an available entry and writes the received packet to the available entry in the system cache.

20 Claims, 5 Drawing Sheets

Related U.S. Application Data application No. 12/782,411, filed on May 18, 2010, now Pat. No. 8,407,707.

(60) Provisional application No. 61/564,811, filed on Nov. 29, 2011.

(51) Int. Cl.
*H04L 12/861* (2013.01)
*G06F 15/78* (2006.01)
*H04L 29/06* (2006.01)

(56) References Cited

U.S. PATENT DOCUMENTS

| | | | |
|---|---|---|---|
| 5,394,534 | A | 2/1995 | Kulakowski et al. |
| 5,623,698 | A | 4/1997 | Stephenson et al. |
| 5,838,931 | A | 11/1998 | Regenold et al. |
| 5,892,766 | A | 4/1999 | Wicki et al. |
| 5,893,120 | A | 4/1999 | Nemes |
| 5,909,695 | A | 6/1999 | Wong et al. |
| 5,943,283 | A | 8/1999 | Wong et al. |
| 5,974,421 | A | 10/1999 | Krishnaswamy et al. |
| 6,026,467 | A | 2/2000 | Petty |
| 6,038,630 | A | 3/2000 | Foster et al. |
| 6,052,697 | A | 4/2000 | Bennett et al. |
| 6,115,802 | A | 9/2000 | Tock et al. |
| 6,195,335 | B1 | 2/2001 | Calvignac et al. |
| 6,216,167 | B1 | 4/2001 | Momirov |
| 6,233,246 | B1 | 5/2001 | Hareski et al. |
| 6,289,013 | B1 | 9/2001 | Lakshman et al. |
| 6,341,130 | B1 | 1/2002 | Lakshman et al. |
| 6,567,564 | B1 | 5/2003 | van der Wal |
| 6,584,546 | B2 | 6/2003 | Kavipurapu |
| 6,636,932 | B1 | 10/2003 | Regev et al. |
| 6,658,012 | B1 | 12/2003 | Baucom, Jr. et al. |
| 6,839,830 | B2 | 1/2005 | Liu |
| 6,907,469 | B1 | 6/2005 | Gallo et al. |
| 6,914,882 | B2 | 7/2005 | Merani et al. |
| 6,918,021 | B2 * | 7/2005 | Krick et al. ............. 711/163 |
| 6,973,551 | B1 * | 12/2005 | Walton ..................... 711/155 |
| 7,058,057 | B2 | 6/2006 | Dooley et al. |
| 7,085,911 | B2 | 8/2006 | Sachedina et al. |
| 7,089,346 | B2 | 8/2006 | Cebulla et al. |
| 7,136,959 | B1 * | 11/2006 | Baxter, III ............... 710/317 |
| 7,159,219 | B2 | 1/2007 | Chen et al. |
| 7,234,018 | B1 | 6/2007 | Purcell et al. |
| 7,287,046 | B2 | 10/2007 | Bulka et al. |
| 7,397,809 | B2 | 7/2008 | Wang |
| 7,453,898 | B1 | 11/2008 | Cohen et al. |
| 7,461,208 | B1 | 12/2008 | Caprioli et al. |
| 7,461,407 | B2 | 12/2008 | Little et al. |
| 7,512,740 | B2 | 3/2009 | Diefendorff |
| 7,519,065 | B2 | 4/2009 | Angle et al. |
| 7,554,464 | B1 | 6/2009 | Oberdorfer |
| 7,594,028 | B1 | 9/2009 | Jacobs et al. |
| 7,596,142 | B1 | 9/2009 | MacAdam |
| 7,600,078 | B1 | 10/2009 | Cen et al. |
| 7,659,894 | B2 | 2/2010 | Keller et al. |
| 7,660,259 | B1 | 2/2010 | Grosser et al. |
| 7,707,367 | B1 * | 4/2010 | Tran et al. ............... 711/154 |
| 7,710,988 | B1 | 5/2010 | Tripathi et al. |
| 7,720,055 | B2 | 5/2010 | Kadambi et al. |
| 7,849,315 | B2 | 12/2010 | Hardy et al. |
| 7,886,150 | B2 | 2/2011 | Stollon et al. |
| 8,127,350 | B2 | 2/2012 | Wei et al. |
| 8,140,759 | B2 | 3/2012 | Frey et al. |
| 2002/0029214 | A1 | 3/2002 | Yianilos et al. |
| 2002/0165985 | A1 | 11/2002 | Chen et al. |
| 2003/0033276 | A1 | 2/2003 | Cheng et al. |
| 2003/0115417 | A1 | 6/2003 | Corrigan |
| 2003/0123468 | A1 | 7/2003 | Nong |
| 2004/0255209 | A1 | 12/2004 | Gross |
| 2005/0027920 | A1 | 2/2005 | Fitzsimmons et al. |
| 2005/0141537 | A1 | 6/2005 | Kumar et al. |
| 2005/0152352 | A1 | 7/2005 | Jun et al. |
| 2006/0029079 | A1 | 2/2006 | Cohen et al. |
| 2006/0256783 | A1 | 11/2006 | Ayrapetian et al. |
| 2007/0011396 | A1 | 1/2007 | Singh et al. |
| 2007/0016756 | A1 | 1/2007 | Hsieh et al. |
| 2007/0043856 | A1 | 2/2007 | Morris et al. |
| 2007/0226798 | A1 | 9/2007 | Sibert |
| 2007/0271374 | A1 | 11/2007 | Shomura et al. |
| 2008/0077928 | A1 | 3/2008 | Matsuzaki et al. |
| 2008/0092092 | A1 | 4/2008 | Dalton et al. |
| 2008/0162793 | A1 | 7/2008 | Chu et al. |
| 2008/0239992 | A1 | 10/2008 | Krasnyanskiy |
| 2008/0240103 | A1 | 10/2008 | Schmidt |
| 2008/0240106 | A1 | 10/2008 | Schlenk |
| 2009/0019270 | A1 | 1/2009 | Halter et al. |
| 2009/0271562 | A1 | 10/2009 | Sinclair |
| 2010/0260198 | A1 | 10/2010 | Rojas-Cessa et al. |
| 2010/0293353 | A1 * | 11/2010 | Sonnier et al. ............ 711/170 |
| 2011/0219195 | A1 | 9/2011 | Habusha et al. |

OTHER PUBLICATIONS

Sundaram, Chandra, Goyal, Shenoy, Sahni, Vin. "Application Performance in the QLinux Multimedia Operating System", ACM Multimedia, Los Angeles, CA (2000).

Lu, Sheng, Dinda. "Size-based Scheduling Policies with Inaccurate Scheduling Information", Proceedings of the IEEE Computer Society's 12th Annual International Symposium on Modeling, Analysis, and Simulation of Computer and Telecommunications Systems (2004).

Schurgers, Raghunathan, Srivastava. "Modulation Scaling for Real-time Energy Aware Packet Scheduling", IEEE, Nov. 2001.

Chiueh et al., "High-Performance IP Routing Table Lookup Using CPU Caching", IEEE (1999).

* cited by examiner

300

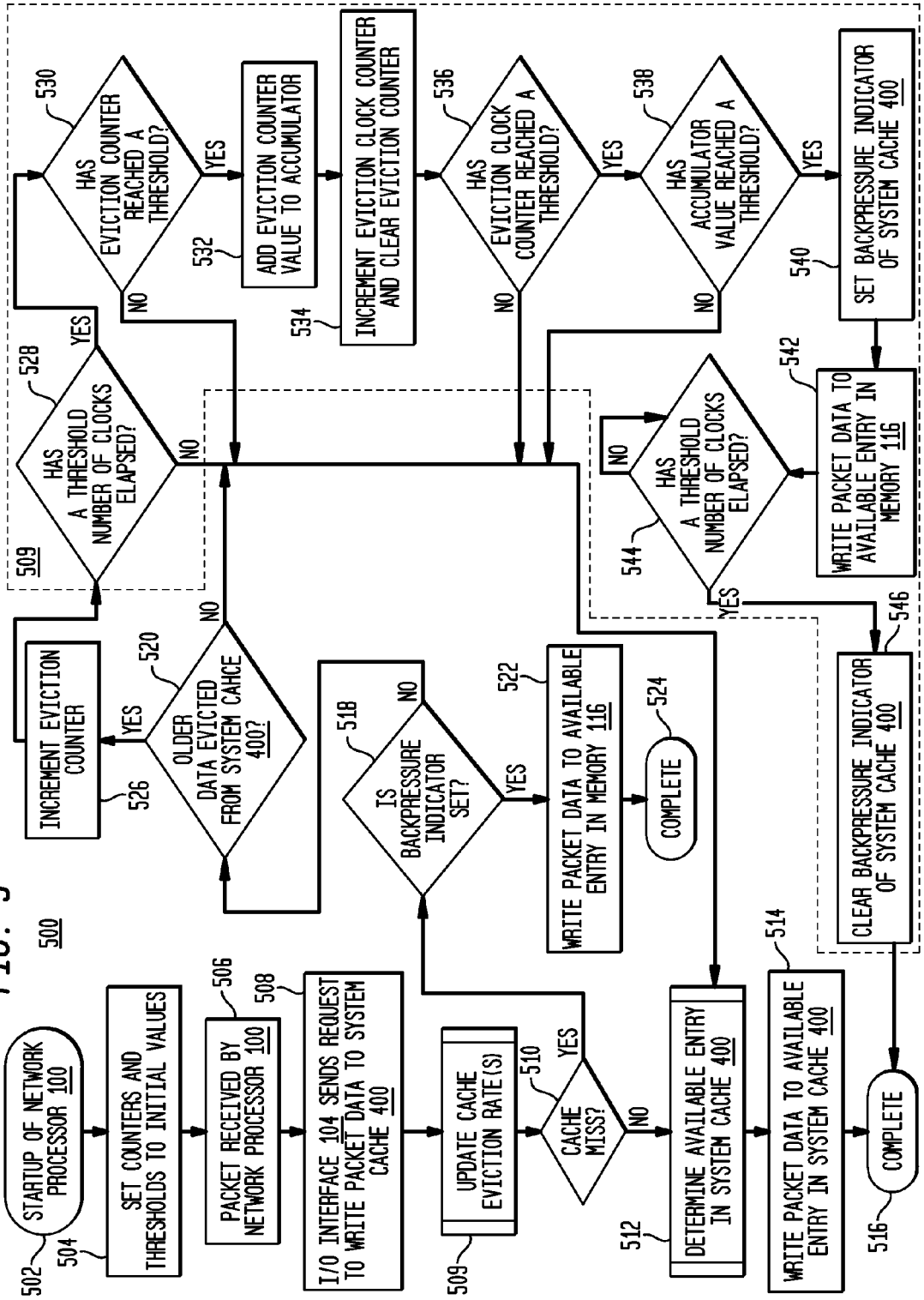

EARLY CACHE EVICTION IN A MULTI-FLOW NETWORK PROCESSOR ARCHITECTURE

CROSS-REFERENCE TO RELATED APPLICATIONS

This application claims the benefit of the filing date of U.S. provisional application No. 61/564,811 filed Nov. 29, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644 and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010 now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28 ,2010 now issued as U.S. Pat. No. 8,489,794, Ser. No. 13/046,717 filed Mar. 12, 2011, Ser. No. 13/046,719 filed Mar. 12, 2011, now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687,719 filed Nov. 28, 2012. Ser. No. 13/687,772 filed Nov. 28, 2012, Ser. No. 13/687,865 filed Nov. 28, 2012, Ser. No. 13/687,911 filed Nov. 28, 2012, and Ser. No. 13/687,958 filed Nov. 28, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments process a received packet of a network processor. An input/output interface of the network processor generates a request to store data of the received packet to a shared system cache. The system cache determines whether an entry associated with a data flow corresponding to the received data packet exists in the system cache. If an associated entry does not exist in the system cache, the system cache determines whether a backpressure indicator of the system cache is set. If the backpressure indicator is set, the data corresponding to the received packet is written to the shared memory. If the backpressure indicator is not set, the system cache determines whether to evict data from the system cache in order to store the data corresponding to the received packet. An eviction rate of the system cache is determined based on a frequency with which older cache entries are evicted to store data corresponding to received packet data. If the eviction rate has reached a backpressure threshold, the system cache sets a backpressure indicator and writes data corresponding to the received packet to the shared memory. If the eviction rate has not reached the backpressure threshold, the system cache determines an available entry and writes the data corresponding to the received packet to the determined available entry in the system cache.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

FIG. 5 shows a flow diagram of an exemplary process for caching packet data for packets received by the network processor of FIG. 1.

DETAILED DESCRIPTION

Described embodiments process a received packet of a network processor. An input/output interface of the network processor generates a request to store data of the received packet to a shared system cache. The system cache determines whether an entry associated with a data flow corresponding to the received data packet exists in the system cache. If an associated entry does not exist in the system cache, the system cache determines whether a backpressure indicator of the system cache is set. If the backpressure indicator is set, the data corresponding to the received packet is written to the shared memory. If the backpressure indicator is not set, the system cache determines whether to evict data from the system cache in order to store the data corresponding to the received packet. An eviction rate of the system cache is determined based on a frequency with which older cache entries are evicted to store data corresponding to received packet data. If the eviction rate has reached a backpressure threshold, the system cache sets a backpressure indicator and writes data corresponding to the received packet to the shared memory. If the eviction rate has not reached the backpressure threshold, the system cache determines an available entry and writes the data corresponding to the received packet to the determined available entry in the system cache.

Table 1 defines a list of acronyms employed throughout this specification as an aid to understanding the described embodiments of the present invention:

TABLE 1

| AMBA | Advanced Microcontroller Bus Architecture | AXI | Advanced eXtensible Interface |
|---|---|---|---|
| CAM | Content Addressable Memory | CPU | Central Processing Unit |
| CRC | Cyclic Redundancy Check | DDR | Double Data Rate |
| DMA | Direct Memory Access | DRAM | Dynamic Random Access Memory |
| ECC | Error Correction Code | FC | Fibre Channel |
| FIFO | First-In, First-Out | I/O | Input/Output |
| IP | Internet Protocol | LRU | Least Recently Used |
| µP | Microprocessor | MMB | Memory Manager Block |
| MPP | Modular Packet Processor | MTM | Modular Traffic Manager |
| PAB | Packet Assembly Block | PCI-E | Peripheral Component Interconnect Express |
| PDU | Protocol Data Unit | PLB | Processor Local Bus |
| RF | Radio Frequency | SAS | Serial Attached SCSI |
| SATA | Serial Advanced Technology Attachment | SCH | Scheduler |
| SCSI | Small Computer System Interface | SED | Stream Editor |
| SoC | System-on-Chip | SPP | Security Protocol Processor |
| SRIO | Serial Rapid I/O | TCP | Transmission Control Protocol |
| USB | Universal Serial Bus | | |

Figure 1:
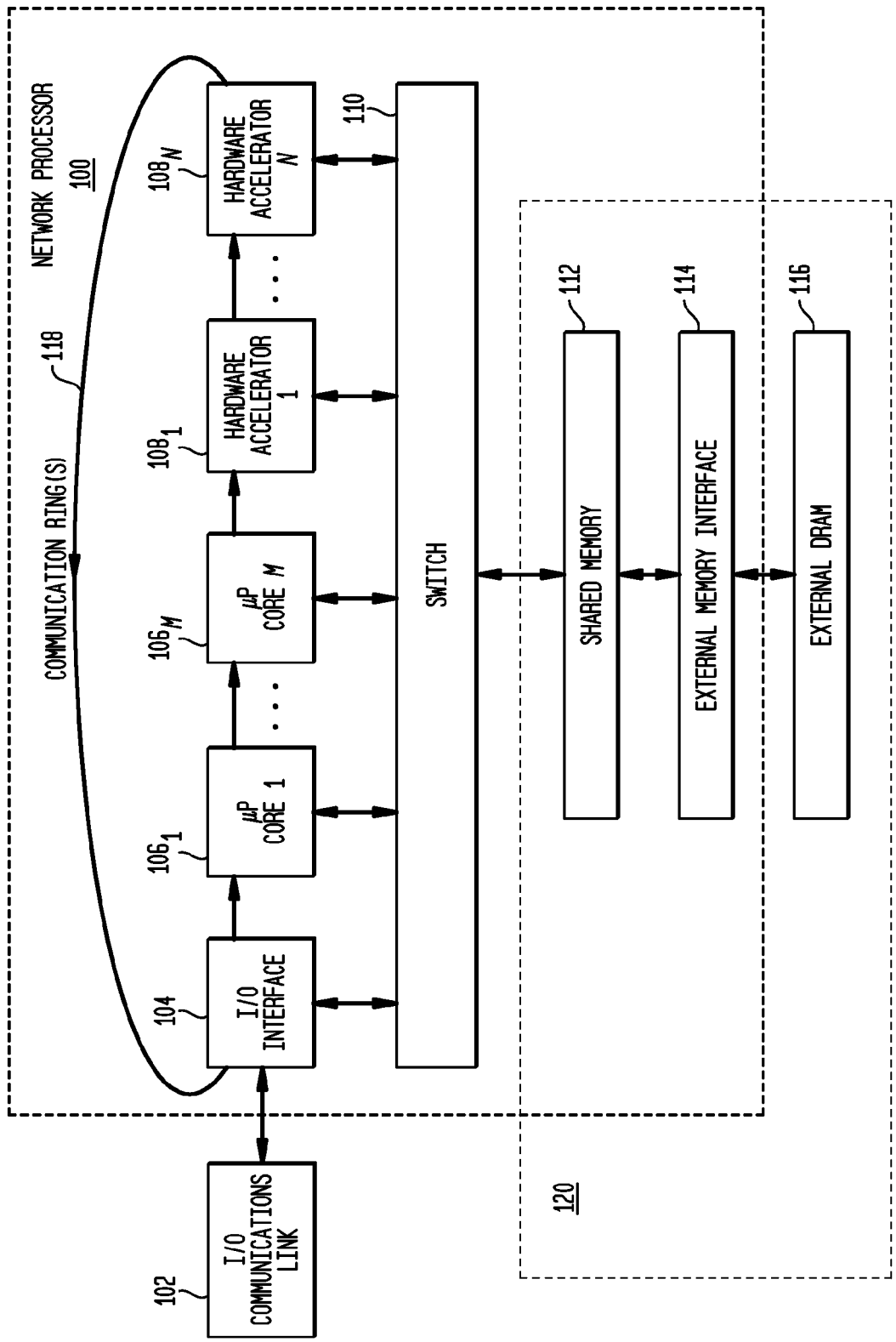
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. Shared memory 112 might be implemented as embedded dynamic random-access memory (eDRAM) internal to network processor 100. External memory 116 might typically be implemented as a double-data-rate (e.g., DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing.

The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250, 898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No.13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Figure 2:
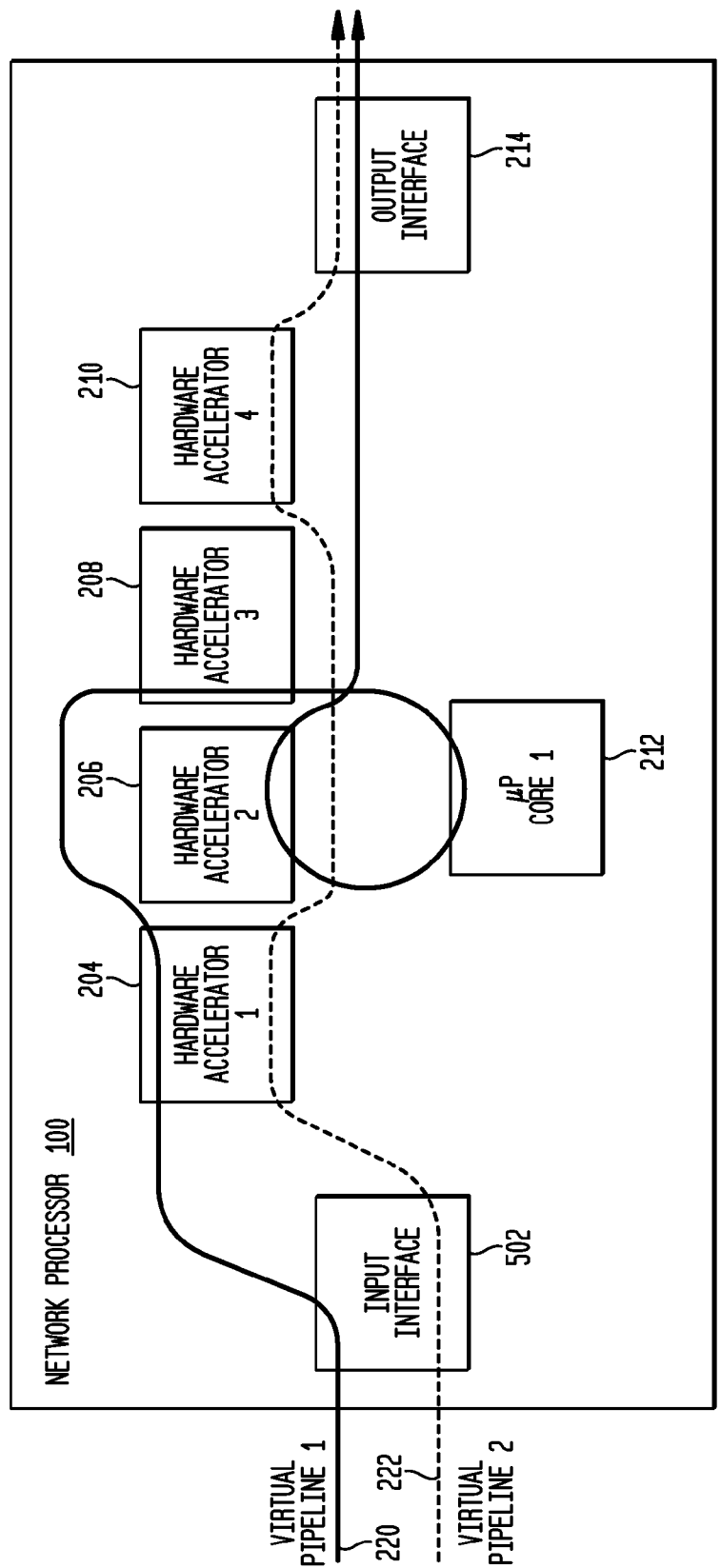
FIG. 2 shows an exemplary data flow of two virtual pipelines through the network processor of FIG. 1.

In exemplary embodiments, virtual pipelines might be defined that determine (1) a flow sequence of processing modules to be used for the task, (2) for each processing module, the required command and parameter fields, and (3) for each field, the source module of data output from a previous engine in the virtual pipeline or data that is constant for the pipeline. FIG. 2 shows a flow of two exemplary virtual pipelines through network processor 100. FIG. 2 shows a first virtual pipeline sequence 220 for processing an exemplary packet, and a second virtual pipeline 222 for processing another exemplary packet. As shown in FIG. 2, virtual pipeline 220 defines a processing order starting at input interface 202 (such as the I/O interface 104 of FIG. 1), hardware accelerator 204, hardware accelerator 208, µP core 212, hardware accelerator 206, and finally output interface 214. However, another packet received by the input interface 202 might be processed in accordance with second virtual pipeline 222. As shown in FIG. 2, virtual pipeline 222 also defines a processing order starting at input interface 202 and hardware accelerator 204 but then proceeds to hardware accelerator 210 and then output interface 214. Processor core 212 and hardware accelerator 206 and 208 are not included in virtual pipeline 222. Because only those hardware accelerators and µP cores that are required are included in a virtual pipeline, network processor 100 has increased efficiency of processing data packets.

As described herein, tasks are primary means of communication between hardware accelerators 108 of network processor 100. As described, a task is a request from a source processing module to a destination processing module for the destination module to perform some processing task. A task might contain packet data, commands, metadata, pointers, control and parameter data, and other information, such as a priority level and flow ID.

The destination processing module might typically store multiple variable-sized data blocks of tasks in an associated queue within shared system memory 112. In some embodiments, each processing module might have multiple task queues associated therewith. In some embodiments, the variable-sized data blocks might be 2 KB. Assigning a task to a particular queue might depends on any one or more of several factors, such as whether the tasks are ordered tasks or unordered tasks, the number of tasks in a given queue, and the size or depth of the queue. Ordered task queues might support parallel processing of tasks while keeping tasks for a given flow in order, while unordered tasks can be processed in any order.

Figure 3:
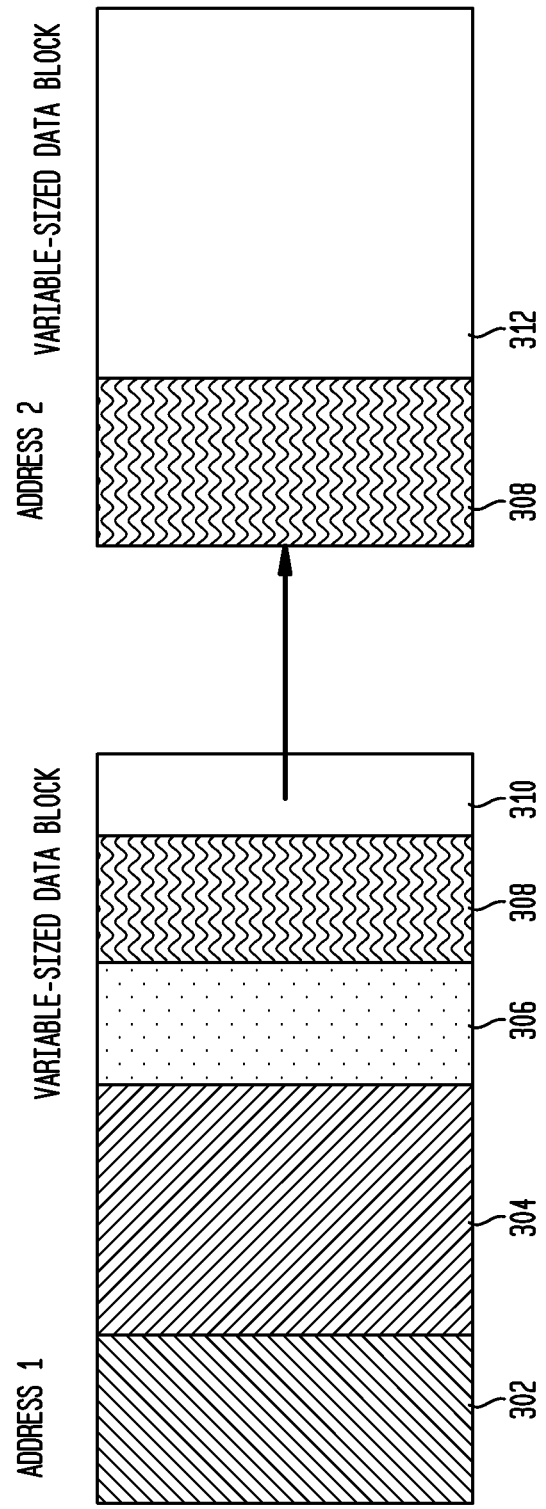
FIG. 3 shows a block diagram of an exemplary task queue structure of processing modules of the network processor of FIG. 1.

When the associated 2 KB block becomes full, the destination processing module sends two addresses in the response to the sourcing engine: (i) the address with the first 2 KB block to start writing the task, and (ii) the beginning address of a next 2 KB block in shared system memory 112. FIG. 3 shows a block diagram of an exemplary task queue structure of a destination core. As shown in FIG. 3, a first task 302 from a source processing module is stored in a queue in shared system memory 112, beginning at Address 1. Task 302 is followed by a second task 304 and a third task 306. Tasks 302-306 might be from any processing module (e.g., µP core 106 or hardware accelerators 108) of network processor 100. Task 306 is followed by a fourth task 308. However, task 308 exceeds a memory boundary of the first memory block of queue 300. In exemplary embodiments of the present invention, the memory boundary of each block is 2 KB. Thus, as a source processing module writes task 308 to the queue, the source processing module appends link 310, which provides a pointer to a next, linked, block of memory where the remainder of the fourth task is stored, starting at Address 2. Empty space 312 in the second block is available for additional tasks to be stored therein. Although shown in FIG. 3 as being at the end of the 2 KB block, link 310 might be placed anywhere within the 2 KB block.

To transfer a task to a destination engine, the source engine sends a request on the task ring. The destination engine responds with the address in the system memory where the task has to be written. Upon receiving the response, the source engine writes the task to the memory address, and sends an acknowledgment to the destination engine. The source processing module then writes the address of the next 2 KB block to a fixed location (e.g., the given offset, or the end of the block) within the first block to create a link between the 2 KB blocks. As described herein, the link does not necessarily have to be at the end of the 2 KB block, but can be anywhere within the block. In exemplary embodiments, if tasks are each 256 B long and each link is 16 B long, the link might be written anywhere after byte 240 in the 2 KB block. The source processing module writes partial task data to the first block and any remaining task data to the second block. The destination processing module reads all the tasks sequentially and when it reaches the end of the 2 KB block and there are more tasks to be read, it reads the link in the 2 KB block. When the link comes back from memory, the destination processing module continues to read the tasks. If the destination processing module is capable of consuming the tasks at a fast rate, the time to read the link might undesirably stall the destination processing module as it does not yet have an address from which to read the additional tasks.

Figure 4:
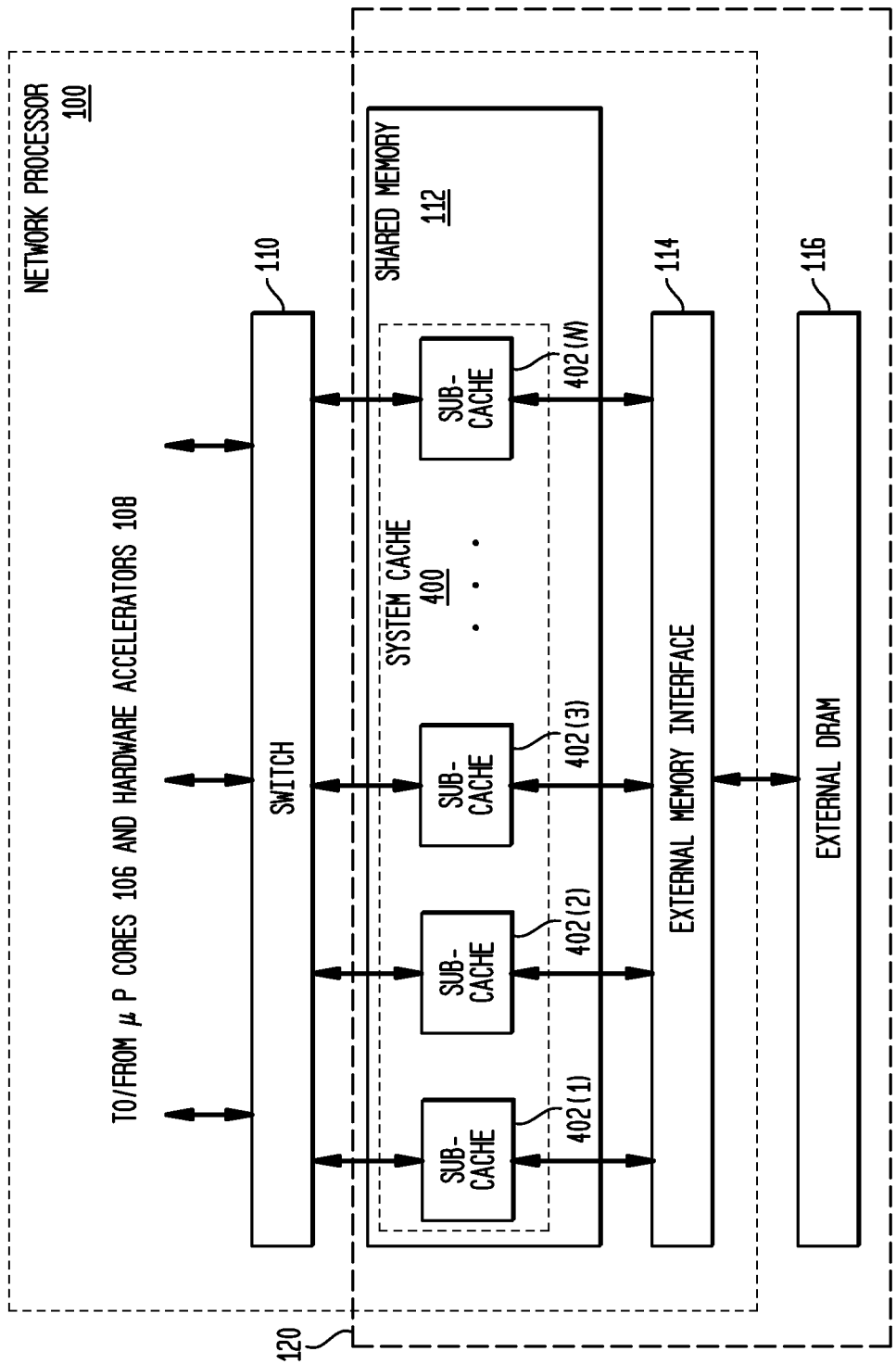
FIG. 4 shows a block diagram of a system cache of the network processor of FIG. 1.

FIG. 4 shows a block diagram of an exemplary embodiment of system cache 400 of network processor 100, in accordance with embodiments of the present invention. As shown in FIG. 4, system cache 400 might be implemented in shared memory 112. System cache 400 might include one or more sub-caches, shown as sub-caches 402(1)-402(N). Sub-caches 402(1)-402(N) might be employed to cache data from any µP core or accelerator (e.g., µP cores 106 or accelerators 108) of network processor 100. As indicated by the dashed line, shared memory 112 and external memory 116 are generally referred to as system memory 120.

As described in related U.S. patent application Ser. Nos. 12/782,379, 12/782,393, and 12/782,411, which are incorporated by reference herein, sub-caches 402(1)-402(N) might be addressed via switch 110 in such a way as to balance access to the caches, referred to herein as striping, helping to avoid hot spots in shared memory 112, improve performance of the caching in and out of external memory 116, and reduce cache access bottlenecks. Thus, in embodiments of the present invention, each sub-cache 402(1)-402(N) might form a memory array, and the number of system caches might preferably be implemented as a power of two. One or more memory blocks might be allocated to each sub-cache 402(1)-402(N). In embodiments of the present invention, each sub-cache 402(1)-402(N) might be implemented as an N-way associative cache employing a least recently used (LRU) caching algorithm. In some embodiments, each sub-cache 402(1)-402(N) might have a total size of 512 kB and a cache line length of 256 B.

As described in related U.S. patent application Ser. Nos. 13/192,104, 13/192,140 and 13/192,187, all filed on Jul. 27, 2011, and all of which are incorporated by reference herein, one or more processing modules of network processor 100 (e.g., μP cores 106 or accelerators 108) might have a corresponding local level one (L1) cache as part of an execution pipeline. In some embodiments, the various μP cores 106 might typically maintain cache coherency by communicating over a coherent communications bus, such as Processor Local Bus (PLB), which is a microprocessor bus architecture introduced by IBM, or Advanced eXtensible Interface (AXI), which is a higher frequency implementation of the Advanced Microcontroller Bus Architecture (AMBA) introduced by ARM Ltd. In some embodiments, local caches of the various hardware accelerators 108 might not communicate over a coherent bus, and thus atomic access operations related U.S. patent application Ser. Nos. 13/192,104, 13/192,140 and 13/192,187, all filed on Jul. 27, 2011, might be employed to maintain coherency with system cache 200.

Thus, described embodiments of network processor 100 employ a system where multiple processing modules (e.g., μP cores 106 or accelerators 108) communicate via a central cache (e.g., system cache 400). Described embodiments avoid "cache thrashing" which might negatively affect performance of network processor 100. In a typical embodiment of network processor 100, as input packets are received by network processor 100, packet data might be written to system cache 400, and one or more tasks corresponding to the packet might be sent to a given processing module ("destination processing module") based on the virtual pipeline associated with the received packet. The destination processing module might typically process such tasks in the order in which they are received by the destination processing module. Each task thus causes a destination processing module to operate on data stored in system cache 400. As each task is processed, corresponding data in system cache 400 might become outdated and, as such, corresponding cache lines might be invalidated.

If the destination processing module slows down, a number of active cache lines might grow, eventually reaching a maximum and causing subsequent cache writes to evict older data from system cache 400, with the older data being written to external memory 116. When the destination module attempts to read data corresponding to an evicted cache line, the cache might return a miss since the data has been evicted. Thus, system cache 400 might need to read the evicted data from external memory 116, which might, in turn, cause another older entry of system cache 400 to be evicted to external memory 116. In such a situation, a given processing module might become stuck in a permanent "cache thrashing" situation where a new cache write causes data to be evicted to external memory 116 and a new cache read has to read evicted data from external memory 116. This might severely negatively affect performance of the destination processing module since the latency of external memory 116 might typically be much greater than the latency of system cache 400. Such cache thrashing might occur even if the destination processing module slows down only momentarily.

Described embodiments of network processor 100 perform cache operations that prevent the cache thrashing scenario such as described above. For example, system cache 400 might generate an indication that a write to external memory 116 took place due to a miss on a cache write operation. In some embodiments, each sub-cache 402(1)-402(N) might generate an indication that a write to external memory 116 took place due to a miss on a cache write operation. The cache write miss indication is provided to the various processing modules of network processor 100 to update a corresponding cache eviction rate. In some embodiments, the source processing module might typically be the processing module that receives data packets and writes the corresponding packet data to system cache 400 (e.g., I/O interface 104).

The source processing module might calculate the eviction rate of system cache 400 (e.g., all of sub-caches 402). The eviction rate of system cache 400 might be determined based on the number of eviction events reached in a first, shorter predetermined time window and a second, longer predetermined time window. In some embodiments, this might be implemented as three counters: a first counter (eviction counter) that counts a number of eviction events; a second counter (clock threshold counter) that counts up to a predetermined threshold number of clocks (clock threshold value, e.g., 100); and a third counter (eviction clock counter) that counts the number of times the second counter reaches the predetermined threshold number of clocks.

Two selectable thresholds and a selectable maximum sample period might also be implemented. In described embodiments, when the value of the second counter reaches the predetermined threshold number of clocks, the value of the first counter (e.g., the number of eviction events) is compared to the first selectable threshold. If the value of the first counter is greater than the first selectable threshold, the difference is added to an accumulating register, the first counter is cleared and the third counter is incremented. If the third counter reaches the maximum sample period value, the value accumulated in the accumulating register is compared to the second selectable threshold. If the accumulated value is greater than or equal to the second selectable threshold, the eviction rate of system cache 400 has reached or exceeded a threshold value, and an indicator is set to indicate that system cache 400 is in a backpressure condition. In some embodiments, the backpressure indicator might be set for a predetermined time and then cleared.

If the source processing module receives packet data while the backpressure indicator of system cache 400 is set, the source processing module might send the packet data to system cache 400 including an indicator that, if there is a cache miss, the packet data should be written directly to external memory 116, without evicting any current entries of system cache 400. operations that cache should do with the data. Thus, described embodiments do not write older data from system cache 400 to external memory 116, which prevents the cache thrashing scenario described herein. When a cache entry is no longer needed (e.g., the destination processing module has completed processing the data), the destination processing module requests that system cache 400 invalidate the corresponding cache entry. In some embodiments, the destination processing module might prefetch a next entry of system cache 400 in this same operation. In some embodiments, when a cache entry is invalidated, system cache 400 might prefetch data for a next packet from external memory 116 before the data is required by a destination processing module. Thus, in some embodiments, system cache 400 might employ a selective most recently used (MRU) replacement algorithm during heavy usage of system cache 400, while employing a least recently used (LRU) replacement algorithm during light or typical usage of system cache 400.

FIG. 5 shows a flow diagram of exemplary process 500 for performing operations of system cache 400 of network processor 100. At step 502, network processor 100 is started, for example at a power up of the network processor. At step 504, counters and thresholds relating to the operation of system cache 400 are configured to initial values. For example, the eviction counter, the clock threshold counter and the eviction clock counter might be cleared to zero, while the eviction counter threshold value, the clock threshold value, the accumulator threshold value and the maximum sample period value might be set to selected predetermined values (e.g., 5, 100, 20 and 10000 respectively). At step 506, data packets are received by network processor 100, for example data packets from devices coupled to I/O communication link 102. Data packets might typically be received from communication link 102 by I/O interface 104. In some embodiments, I/O interface 104 might perform some initial processing of the received data packet (e.g., reading or decoding header information, etc.). I/O interface 104 might typically transfer received packet data to system cache 400 such that packet data is accessible for processing by various of the processing modules (e.g., µP cores 106 or accelerators 108) of network processor 100. At step 508, I/O interface 104 requests a location in system cache 400 in which to write the received packet data. At step 509, cache eviction rate data might typically be broadcast to the various processing modules of network processor 100 (e.g., µP cores 106 or accelerators 108) such that, in parallel with writing data to the system cache, the processing modules are tracking the cache eviction rate (e.g., as indicated by the dashed line showing that step 509 performs steps 528-546).

At step 510, if there is a cache miss for the write request (e.g., there is not already an entry in system cache 400 corresponding to packet data having the same address as the current received packet), process 500 proceeds to step 518. Otherwise, at step 510, if there is a cache hit (e.g., there is already an entry in system cache 400 corresponding to packet data having the same address as the current received packet) then, at step 512, system cache 400 determines an available entry for the received packet data. At step 514, the packet data is written to the entry determined at step 512. At step 516, process 500 completes.

In some embodiments, at step 522 an entry in system cache 400 might be determined substantially as described in U.S. patent application Ser. No. 12/782,411, which is incorporated by reference herein. For example, system caches 402 might be selected so as to balance access to each cache, referred to herein as cache striping, improving performance of system cache 400 by avoiding hot spots in system cache 400 and reducing cache access bottlenecks. Randomized striping across sub-caches 402 evenly distributes data access across the various cache banks Selecting one of sub-caches 402 (or entries within sub-caches 402) in which to write the received packet data might be performed by generating a physical address to system cache 400 (and sub-caches 402) by performing a hash operation based on, for example, a pseudo-random number and at least a portion of a logical address of system cache 400 associated with the packet data. Thus, system cache 400 might avoid a bias towards storing packet data in a particular sub-cache 402 (or particular memory block(s) within a given sub-cache 402).

At step 510, if there was a cache miss, at step 518 if the system cache backpressure indicator is set (e.g., either for system cache 400 as a whole, or for individual ones of sub-caches 402), then, at step 522, the received packet data is written directly to memory 116 in order to avoid cache thrashing as described herein. If, at step 518, the system cache backpressure indicator is not set (e.g., either for system cache 400 as a whole, or for individual ones of sub-caches 402), then process 500 proceeds to step 520. If, at step 520, no older data is evicted from system cache 400 in order to write the received packet data, then process 500 proceeds to step 512 where system cache 400 determines an available entry for the received packet data. At step 514, the packet data is written to the entry determined at step 512. At step 516, process 500 completes. If, at step 520, older data is evicted from system cache 400 in order to write the received packet data, process 500 proceeds to step 526.

At step 526, the eviction counter is incremented corresponding to data being evicted from system cache 400 to memory 116 at step 520 in order to make an entry in system cache 400 available for the newly received packet data. At step 528, if a threshold number of clocks has not elapsed (e.g., the clock threshold counter has not reached the clock threshold value), then process 500 proceeds to step 512, where system cache 400 determines an available entry for the received packet data. At step 528, if a threshold number of clocks has elapsed (e.g., the clock threshold counter has reached the clock threshold value), then process 500 proceeds to step 530. At step 530, if the eviction counter has not reached a threshold (e.g., the eviction counter has not reached the eviction counter threshold), then process 500 proceeds to step 512 where system cache 400 determines an available entry for the received packet data. At step 530, if the eviction counter has reached a threshold (e.g., the eviction counter has reached the eviction counter threshold), then process 500 proceeds to step 532 where the eviction counter value is added to an accumulator value. At step 534, the eviction clock counter is incremented and the eviction counter is cleared. At step 536, if the eviction clock counter has not reached a threshold (e.g., the eviction clock counter has not reached the maximum sample period value), then process 500 proceeds to step 512 where system cache 400 determines an available entry for the received packet data. At step 536, if the eviction clock counter has reached a threshold (e.g., the eviction clock counter has reached the maximum sample period value), then process 500 proceeds to step 538 where the accumulator value is compared to the accumulator threshold value. If, at step 538, the accumulator value has not reached the accumulator threshold value, then process 500 proceeds to step 512 where system cache 400 determines an available entry for the received packet data.

If, at step 538, the accumulator value has reached the accumulator threshold value, then at step 540 the backpressure indicator of system cache 400 (or the corresponding one of sub-caches 402) is set, indicating that an eviction rate of system cache 400 (or the corresponding one of sub-caches 402) has exceeded a threshold value. At step 542, the received packet data is written directly to memory 116 in order to avoid cache thrashing as described herein. At step 544, if a threshold number of clocks has elapsed, then at step 546 the backpressure indicator set at step 540 is cleared, and process 500 completes at step 516.

Thus, described embodiments process a received packet of a network processor. An input/output interface of the network processor generates a request to store data of the received packet to a shared system cache. The system cache determines whether an entry associated with a data flow corresponding to the received data packet exists in the system cache. If an associated entry does not exist in the system cache, the system cache determines whether a backpressure indicator of the system cache is set. If the backpressure indicator is set, the data corresponding to the received packet is written to the shared memory. If the backpressure indicator is not set, the system cache determines whether to evict data from the system cache in order to store the data corresponding to the received packet. An eviction rate of the system cache is determined based on a frequency with which older cache entries are evicted to store data corresponding to received packet data. If the eviction rate has reached a backpressure threshold, the system cache sets a backpressure indicator and writes data corresponding to the received packet to the shared memory. If the eviction rate has not reached the backpressure threshold, the system cache determines an available entry and writes the data corresponding to the received packet to the determined available entry in the system cache.

While the exemplary embodiments have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. A method of processing a received packet of a network processor, wherein the network processor comprises a plurality of processing modules, a shared system cache and a shared memory, the method comprising:
    generating, by an input/output interface of the network processor, a request to store data to the shared system cache, the data corresponding to the received packet;
    determining, by the system cache, whether an entry associated with a data flow corresponding to the received data packet exists in the system cache;
    if an associated entry does not exist in the system cache:
        determining whether a backpressure indicator of the system cache is set;
        if the backpressure indicator is set:
            writing the data corresponding to the received packet to the shared memory;
        if the backpressure indicator is not set:
            determining whether to evict data from the system cache in order to store the data corresponding to the received packet;
            determining an eviction rate of the system cache, wherein the eviction rate measures a frequency with which older cache entries are evicted to store data corresponding to received packets;
            if the determined eviction rate has reached a backpressure threshold:
                setting the backpressure indicator of the system cache; and
                writing the data corresponding to the received packet to the shared memory;
            if the determined eviction rate has not reached the backpressure threshold:
                determining an available entry in the system cache; and
                writing the data corresponding to the received packet to the determined available entry in the system cache.

2. The method of claim 1, wherein the step of determining an eviction rate of the system cache comprises:
    if a threshold number of clocks has been reached:
        if an eviction counter of the system cache has reached a first threshold:
            accumulating the eviction counter value to an accumulator;

incrementing an eviction clock counter and clearing the eviction counter;
if the accumulator value has reached a second threshold:
determining that the eviction rate of the system cache has reached the backpressure threshold;
otherwise:
determining that the eviction rate of the system cache has not reached the backpressure threshold.

3. The method of claim 1, wherein, for the method, the system cache comprises a plurality of sub-caches.

4. The method of claim 3, wherein the step of determining an available entry in the system cache comprises:
striping, by a switch of the network processor, data corresponding to received packets across each of the plurality of sub-caches, wherein the striping provides substantially balanced access to each of the plurality of sub-caches, thereby reducing memory hot spots and access bottlenecks in the system cache.

5. The method of claim 3, wherein the backpressure indicator of the system cache comprises a backpressure indicator for each sub-cache.

6. The method of claim 1, wherein the step of determining whether to evict data from the system cache in order to store the data corresponding to the received packet comprises:
invalidating, by the system cache, one or more entries of the system cache that are not in use;
prefetching, by the system cache from the shared memory, data corresponding to one or more subsequent received packets; and
storing the prefetched data corresponding to one or more subsequent received packets in the invalidated one or more entries of the system cache.

7. The method of claim 6, further comprising:
employing, by the system cache, a least recently used (LRU) replacement algorithm during non-backpressured operation of the system cache; and
employing, by the system cache, a most recently used (MRU) replacement algorithm during backpressured operation of the system cache.

8. The method of claim 1, further comprising:
clearing the backpressure indicator of the system cache after a predetermined time elapses.

9. The method of claim 1, further comprising:
determining, based on the corresponding flow identifier, a processing order for the data corresponding to the received packet by one or more of the plurality of processing modules of the network processor.

10. The method of claim 1, wherein, for the method:
the system cache comprises at least one embedded dynamic random access memory (eDRAM) internal to the network processor; and
the shared memory comprises at least one DRAM external to the network processor.

11. A non-transitory machine-readable medium, having encoded thereon program code, wherein, when the program code is executed by a machine, the machine implements a method of processing a received packet of a network processor, wherein the network processor comprises a plurality of processing modules, a shared system cache and a shared memory, the method comprising:
generating, by an input/output interface of the network processor, a request to store data to the shared system cache, the data corresponding to the received packet;
determining, by the system cache, whether an entry associated with a data flow corresponding to the received data packet exists in the system cache;
if an associated entry does not exist in the system cache:
determining whether a backpressure indicator of the system cache is set;
if the backpressure indicator is set:
writing the data corresponding to the received packet to the shared memory;
if the backpressure indicator is not set:
determining whether to evict data from the system cache in order to store the data corresponding to the received packet;
determining an eviction rate of the system cache, wherein the eviction rate measures a frequency with which older cache entries are evicted to store data corresponding to received packets;
if the determined eviction rate has reached a backpressure threshold:
setting the backpressure indicator of the system cache; and
writing the data corresponding to the received packet to the shared memory;
if the determined eviction rate has not reached the backpressure threshold:
determining an available entry in the system cache; and
writing the data corresponding to the received packet to the determined available entry in the system cache.

12. The non-transitory machine-readable medium of claim 11, wherein the step of determining an eviction rate of the system cache comprises:
if a threshold number of clocks has been reached:
if an eviction counter of the system cache has reached a first threshold:
accumulating the eviction counter value to an accumulator;
incrementing an eviction clock counter and clearing the eviction counter;
if the accumulator value has reached a second threshold:
determining that the eviction rate of the system cache has reached the backpressure threshold;
otherwise:
determining that the eviction rate of the system cache has not reached the backpressure threshold.

13. The non-transitory machine-readable medium of claim 12, wherein the system cache comprises a plurality of sub-caches and the step of determining an available entry in the system cache comprises:
striping, by a switch of the network processor, data corresponding to received packets across each of the plurality of sub-caches, wherein the striping provides substantially balanced access to each of the plurality of sub-caches, thereby reducing memory hot spots and access bottlenecks in the system cache, and
wherein the backpressure indicator of the system cache comprises a backpressure indicator for each sub-cache.

14. The non-transitory machine-readable medium of claim 11, wherein the step of determining whether to evict data from the system cache in order to store the data corresponding to the received packet comprises:
invalidating, by the system cache, one or more entries of the system cache that are not in use;
prefetching, by the system cache from the shared memory, data corresponding to one or more subsequent received packets; and storing the prefetched data corresponding to one or more subsequent received packets in the invalidated one or more entries of the system cache.

15. The non-transitory machine-readable medium of claim 14, further comprising:
employing, by the system cache, a least recently used (LRU) replacement algorithm during non-backpressured operation of the system cache; and
employing, by the system cache, a most recently used (MRU) replacement algorithm during backpressured operation of the system cache.

16. The non-transitory machine-readable medium of claim 11, further comprising:
clearing the backpressure indicator of the system cache after a predetermined time elapses.

17. The non-transitory machine-readable medium of claim 11, further comprising:
determining, based on the corresponding flow identifier, a processing order for the data corresponding to the received packet by one or more of the plurality of processing modules of the network processor.

18. A network processor comprising:
a plurality of processing modules, the processing modules comprising at least one of microprocessors and hardware accelerators;
a shared system cache comprising at least one embedded dynamic random access memory (eDRAM) internal to the network processor;
a shared memory comprising at least one dynamic random access memory (DRAM) external to the network processor;
an input/output interface configured to (i) receive data packets received from a network coupled to the network processor, and (ii) generate a request to store data to the shared system cache, the data corresponding to the received packet;
the system cache configured to determine whether an entry associated with a data flow corresponding to the received data packet exists in the system cache;
if an associated entry does not exist in the system cache:
the system cache is configured to determine whether a backpressure indicator of the system cache is set;
if the backpressure indicator is set:
the system cache is configured to write the data corresponding to the received packet to the shared memory;
if the backpressure indicator is not set:
the system cache is configured to determine whether to evict data from the system cache in order to store the data corresponding to the received packet;
each of the plurality of processing modules configured to determine an eviction rate of the system cache, wherein the eviction rate measures a frequency with which older cache entries are evicted to store data corresponding to received packets;
if the determined eviction rate has reached a backpressure threshold:
the system cache is configured to (i) set the backpressure indicator, and (ii) write the data corresponding to the received packet to the shared memory;
if the determined eviction rate has not reached the backpressure threshold:
the system cache is configured to (i) determine an available entry in the system cache, and (ii) write the data corresponding to the received packet to the determined available entry in the system cache.

19. The network processor of claim 18, wherein:
the system cache comprises a plurality of sub-caches, wherein the backpressure indicator of the system cache comprises a backpressure indicator for each sub-cache;
a switch of the network processor is configured to stripe data corresponding to received packets across each of the plurality of sub-caches, wherein the striping provides substantially balanced access to each of the plurality of sub-caches, thereby reducing memory hot spots and access bottlenecks in the system cache, and
the plurality of processing modules are each configured to determine the eviction rate of the system cache by:
if a threshold number of clocks has been reached:
if an eviction counter of the system cache has reached a first threshold:
accumulating the eviction counter value to an accumulator;
incrementing an eviction clock counter and clearing the eviction counter;
if the accumulator value has reached a second threshold:
determining that the eviction rate of the system cache has reached the backpressure threshold;
otherwise:
determining that the eviction rate of the system cache has not reached the backpressure threshold.

20. The network processor of claim 18, wherein the network processor is implemented in an integrated circuit chip.

* * * * *